Patented June 18, 1940

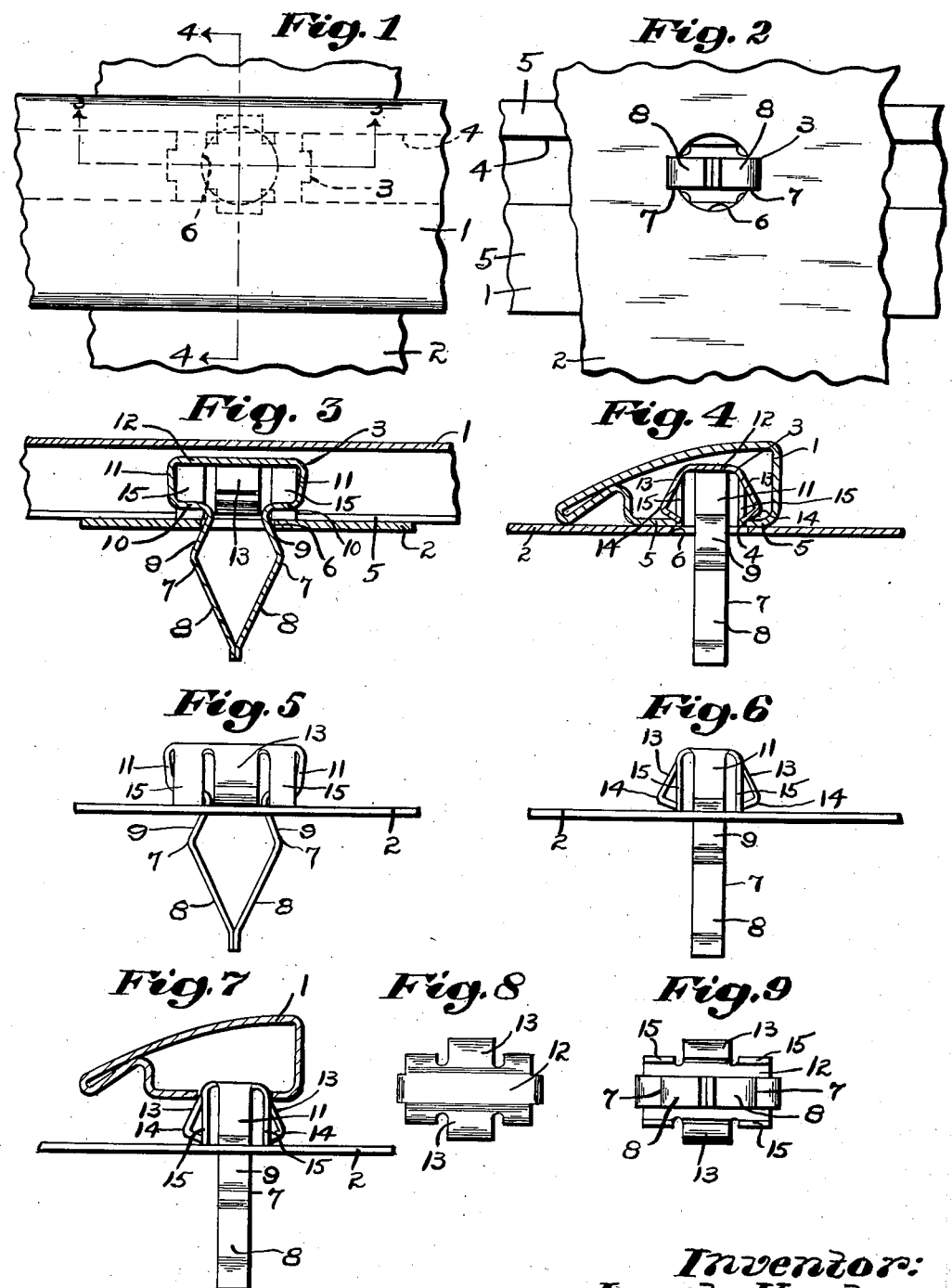

2,205,363

UNITED STATES PATENT OFFICE 2,205,363

SNAP FASTENER MEMBER

Joseph Kral, Cambridge, Mass., assignor to United-Carr Fastener Corporation, Cambridge, Mass., a corporation of Massachusetts Application November 3, 1937, Serial No. 172,538

4 Claims. (Cl. 24—73)

My invention relates to double snap fastener members of the type designed for fastening together two apertured bodies.

In the drawing, in which I have illustrated a preferred embodiment of my invention:

Figure 1 is a front elevation of a molding strip secured to a supporting structure, my improved fastener member being shown in dotted lines;

Fig. 2 is a rear elevation of the installation shown in Fig. 1;

Fig. 3 is a section taken along the line 3—3 of Fig. 1;

Fig. 4 is a section taken along the line 4—4 of Fig. 1;

Fig. 5 is a side elevation of my improved fastener member secured to a supporting structure and in position to receive a molding strip;

Fig. 6 is a view of the installation shown in Fig. 5, but with the installation turned 45°;

Fig. 7 is a view similar to that of Fig. 6 but showing a molding strip in position to be snapped over the head of the fastener member whereby it may be secured to the supporting structure;

Fig. 8 is a top view of my fastener member per se; and

Fig. 9 is a bottom view of my fastener member per se.

My invention, as illustrated in the accompanying drawing, relates specifically, though not exclusively, to a fastener secured installation in which an apertured part such as a hollow molding and the like is quickly and easily attached to a supporting structure, such as the frame of an automobile body, by means of my improved fastener member. The particular installation shown in the drawing which I have chosen to illustrate the preferred use of my invention comprises an apertured molding 1, of the type now frequently used on the bodies of automobiles and elsewhere, secured to a relatively thin supporting structure 2 by means of my improved double snap fastener member 3. It should be understood, however, that my fastener members may be satisfactorily used for attaching other parts together than those specifically illustrated in the drawing. The molding strip 1 is of the type commonly used for ornamental purposes and has an aperture 4 running longitudinally of one of its sides and inwardly-bent flanges 5—5 provided adjacent the aperture 4. The supporting structure 2, which is preferably of thin metal material, is provided with an aperture 6 to receive a stud means of the fastener member 3.

Referring to my preferred form of fastener member, I have shown a fastener member of simple construction which is formed from one piece of spring metal. The fastener member 3, in my preferred construction, has attaching portions in the form of oppositely-arranged yieldable legs 7—7 which provide a shank portion having portions 8—8 diverging from the leading ends of the legs and converging portions 9—9 forming shoulders for making snap fastener engagement with the aperture 6 of the support 2. The legs 7—7 have outwardly-extending portions 10—10 at the free ends of the converging portions 9—9 extending substantially transversely to the axis of the shank (Fig. 3) and upwardly-extending portions 11—11 at the free ends of the portions 10—10. The upwardly-extending portions 11—11 are joined together at their free ends by a connecting portion 12 whereby the legs 7—7 are joined at their ends opposed to their leading ends, as most clearly shown in Fig. 3. A pair of oppositely-arranged yieldable portions 13—13 are provided at that end of the fastener member having the connecting portion 12. The portions 13—13 are integrally joined to opposed edges of the connecting portion 12 intermediate the legs 7—7. In my preferred construction the yieldable portions diverge from the connecting portion 12 and then converge forming shoulders 14—14 for engagement with the flanges 5—5 of the molding 1. As a means for spacing the shoulders 14—14 from the supporting structure 2 so that the shoulders may be snapped through the aperture 4 of the molding 1, I have provided spacing portions in the form of lugs 15—15 disposed substantially inwardly from the shoulders 14—14 and having free end portions adapted to substantially abut a surface of the supporting structure 2. In my preferred construction a pair of the lugs 15—15 is provided integral with each of the opposed edges of the connecting portion 12 with the lugs of each pair disposed on opposite sides of the respective yieldable portion 13, as most clearly shown in Figs. 3, 5 and 9. It will be noticed that the lugs of each pair are spaced laterally from the plane of the line of movement of the yieldable portions 13—13 so as not to interfere with proper contraction and expansion of the yieldable portions.

As a result of the particular formation of my fastener member, I have provided a pair of yieldable shouldered portions adapted to extend through the aperture 6 of the supporting structure 2 so as to secure the fastener member thereto and a pair of yieldable shouldered portions adapted to engage the inwardly-extending flanges 5—5 of the molding strip 1 for attaching the molding to the supporting structure 2. Assembly of the component parts of the installation is a relatively simple matter and is carried out through first snapping the stud-shaped shank of the legs 7—7 of the fastener member through the aperture 6 of the support 2. After the fastener member has been secured to the supporting structure 2, the outermost free ends of the lug portions 15 engage material of the upper surface of the supporting structure 2 adjacent the aperture 6, as most clearly shown in Fig. 3, thereby spacing the shoulders 14—14 relative to the support for engagement with the molding strip 1 through its aperture. Although I have shown only one fastener member secured to the supporting structure 2, it is understood that as many fastener members may be provided as are necessary for securing the molding 1 thereto. In assembling the molding 1 with the fastener member, the flanges 5—5 are moved into engagement with the diverging portions of the yieldable portions 13—13, as most clearly shown in Fig. 7, and direct downward pressure is exerted upon the top of the molding so as to force the flanges over the shoulders 14—14 by a snap action. This snap action is accomplished through natural resiliency of the portions 13—13 which are enabled to move back and forth in a plane which is substantially transverse to the plane of the line of movement of the socket-engaging portions of the legs 7—7. After the molding has been attached to the support, the free edges of the flanges 5—5 are disposed substantially adjacent outer broad surfaces of the respective pairs of the lugs 15—15, as most clearly shown in Fig. 4, whereby lateral movement of the molding relative to the fastener member is restricted and the parts of the installation are held in rigid and compact assembly.

Although I have illustrated and described a preferred embodiment of my invention, I do not wish to be limited thereby because the scope of my invention is best defined by the following claims.

I claim:

1. A double snap fastener member for securing an apertured part to an apertured support, said fastener member comprising attaching portions having shoulders for snap fastening engagement with the inner surface of a support through an aperture thereof, a connecting portion joining said attaching portions at one end, yieldable portions extending from said connecting portion in the direction of said shoulders of said attaching portions and having cooperating shoulders for snap fastener engagement through the aperture in said apertured part, and spacing means comprising integral parts of said fastener member integrally joined to said connecting portion and disposed on the same sides thereof as said yieldable portions, each of said spacing means having a portion spaced from said connecting portion and said yieldable portions and disposed a greater distance from said connecting portion in the direction of the shoulders of said attaching portions than said shoulders of said yieldable portions thereby to engage the outer surface of said support to space said shoulders from said support.

2. A double snap fastener for securing an apertured part to an apertured support, said fastener member comprising a pair of opposed shouldered leg portions for engagement with said support through an aperture thereof, a connecting portion joining said legs at one end, yieldable portions extending from opposed edges of said connecting portion in a direction toward said leg portions having shoulders for snap fastener engagement with said apertured part through an aperture thereof, and a pair of spacing portions extending from each of said opposed edges of said connecting portion in a direction toward said leg portions, said spacing portions having support-engaging portions disposed a greater distance from said connecting portion than said shoulders of said yieldable portions for engagement with said apertured support to space said shoulders from said support and each of said shouldered portions extending from said connecting portion intermediate the spacing portions of each of said respective pairs.

3. A double snap fastener member for securing an apertured part to an apertured support, said fastener member comprising a pair of opposed yieldable leg portions diverging from their free leading ends and then converging forming shoulders for engagement with said support through an aperture thereof, outwardly-projecting portions extending from the free ends of said converging portions in angular relation to the axis of said leg portions, upwardly-extending portions at the free ends of said outwardly-projecting portions and a connecting portion joining said upwardly-extending portions, yieldable portions extending from opposed edges of said connecting portion in a direction toward said leg portions having shoulders for snap fastener engagement with said apertured part through an aperture thereof, and a pair of lug-shaped spacing portions extending from each of the opposed edges of said connecting portion in a direction toward said leg portions, the lug portions of each of said pairs disposed on opposed sides of said respective yieldable portions and said lug-shaped portions having support-engaging portions adjacent their free ends disposed a greater distance from said connecting portion than the shoulders of said yieldable portions for engagement with said apertured support to space said shoulders from said support.

4. A double snap fastener member for securing an apertured part to an apertured support, said fastener comprising shouldered attaching portions for snap fastener engagement with a support through an aperture thereof, an elongated ribbon-like connecting portion joining said attaching portions at one end, yieldable portions extending from said connecting portion and having cooperating shoulders for snap fastener engagement through the aperture in said apertured part, said yieldable portions being disposed laterally of the longitudinal edges of said connecting portion, and spacing portions extending from said connecting portion and disposed laterally of said longitudinal edges thereof, said spacing portions extending from said connecting portion beyond said shoulders of said yieldable portions in a direction toward said attaching portions for engagement with said apertured support to space said shoulders from said support.

JOSEPH KRAL.